(12) United States Patent
Malluhi et al.

(10) Patent No.: US 11,748,197 B2
(45) Date of Patent: Sep. 5, 2023

(54) DATA STORAGE METHODS AND SYSTEMS

(71) Applicants:Qatar Foundation for Education, Science and Community Development, Doha (QA); Qatar University, Doha (QA)

(72) Inventors: Qutaibah Malluhi, Doha (QA); Naram Mhaisen, Doha (QA)

(73) Assignees: QATAR FOUNDATION FOR EDUCATION, SCIENCE AND COMMUNITY DEVELOPMENT, Doha (QA); QATAR UNIVERSITY, Doha (QA)

( * ) Notice: Subject to any disclaimer, the term of this patent is extended or adjusted under 35 U.S.C. 154(b) by 476 days.

(21) Appl. No.: 16/777,609

(22) Filed: Jan. 30, 2020

(65) Prior Publication Data

US 2020/0250034 A1   Aug. 6, 2020

Related U.S. Application Data

(60) Provisional application No. 62/799,634, filed on Jan. 31, 2019.

(51) Int. Cl.
*G06F 11/10* (2006.01)
*G06F 11/14* (2006.01)
(Continued)

(52) U.S. Cl.
CPC ...... *G06F 11/1076* (2013.01); *G06F 9/30029* (2013.01); *G06F 9/30032* (2013.01);
(Continued)

(58) Field of Classification Search
CPC ............. G06F 11/1076; G06F 9/30029; G06F 9/30032; G06F 9/3885; G06F 11/108;
(Continued)

(56) References Cited

U.S. PATENT DOCUMENTS 5,499,253 A    3/1996  Lary
5,579,475 A   11/1996  Blaum et al.
(Continued)

OTHER PUBLICATIONS

Corbett et al. "Row-Diagonal Parity for Double Disk Failure Correction"; Third USENIX Conference on File and Storage Technologies Mar. 31-Apr. 2, 2004. [Accessed on the Internet on Jun. 7, 2022] [Accessed from <URL://https://www.usenix.org/legacy/events/fast04/tech/corbett/corbett.pdf (Year: 2004).*
(Continued)

*Primary Examiner* — David Yi
*Assistant Examiner* — Dustin B. Fulford
(74) *Attorney, Agent, or Firm* — Foley & Lardner LLP

(57) ABSTRACT

A data storage method includes partitioning a data into an array having a plurality of data blocks and storing the data blocks across a plurality of storage nodes. Parity blocks are encoded based on the data array by performing a shift operation on the data array to produce a shifted array and performing an exclusive OR (XOR) operation on the elements in each row of the shifted array to produce a parity block. The method further includes storing the parity blocks across a plurality of the storage nodes. Systems are configured to recover data from a data array in the event that the data array is at least partly inaccessible.

13 Claims, 12 Drawing Sheets

(51) Int. Cl.
  G06F 21/60    (2013.01)
  G06F 9/30     (2018.01)
  G06F 9/38     (2018.01)
(52) U.S. Cl.
  CPC .......... *G06F 9/3885* (2013.01); *G06F 11/108* (2013.01); *G06F 11/1464* (2013.01); *G06F 11/1469* (2013.01); *G06F 21/602* (2013.01); *G06F 2211/1028* (2013.01)
(58) Field of Classification Search
  CPC ............. G06F 11/1464; G06F 11/1469; G06F 21/602; G06F 2211/1028
  See application file for complete search history.

(56) References Cited

U.S. PATENT DOCUMENTS

| | | | | |
|---|---|---|---|---|
| 5,862,158 | A | * | 1/1999 | Baylor ................ G06F 11/1076 714/E11.034 |
| 6,138,125 | A | | 10/2000 | Demoss |
| 6,148,430 | A | | 11/2000 | Weng |
| 8,639,552 | B1 | | 1/2014 | Chen et al. |
| 8,712,982 | B2 | | 4/2014 | Holt et al. |
| 10,348,810 | B1 | | 7/2019 | Florissi et al. |
| 10,372,760 | B2 | | 8/2019 | Pedapudi et al. |
| 2005/0108371 | A1 | | 5/2005 | Manion et al. |
| 2006/0074954 | A1 | * | 4/2006 | Hartline .............. G06F 11/1076 |
| 2009/0204718 | A1 | | 8/2009 | Lawton et al. |
| 2010/0199042 | A1 | | 8/2010 | Bates et al. |
| 2012/0047339 | A1 | | 2/2012 | Decasper et al. |
| 2013/0110778 | A1 | | 5/2013 | Taylor et al. |
| 2014/0164315 | A1 | | 6/2014 | Golshan |
| 2014/0168073 | A1 | | 6/2014 | Chizeck et al. |
| 2015/0143501 | A1 | | 5/2015 | Cherukuri et al. |
| 2015/0372943 | A1 | | 12/2015 | Hasan et al. |
| 2016/0105488 | A1 | | 4/2016 | Thakkar et al. |
| 2017/0272209 | A1 | * | 9/2017 | Yanovsky ............. H03M 13/13 |
| 2017/0364345 | A1 | | 12/2017 | Fontoura et al. |
| 2018/0083835 | A1 | | 3/2018 | Cole et al. |
| 2019/0138430 | A1 | | 5/2019 | Smiljanic et al. |
| 2019/0238590 | A1 | | 8/2019 | Talukdar et al. |
| 2019/0363895 | A1 | | 11/2019 | Barr et al. |
| 2019/0370362 | A1 | | 12/2019 | Mainali et al. |
| 2020/0034548 | A1 | | 1/2020 | Wu et al. |
| 2021/0012538 | A1 | | 1/2021 | Wang et al. |

OTHER PUBLICATIONS

Blaum, et al., "A Family of MDS Array Codes with Minimal Number of Encoding Operations", IEEE, International Symposium on Information Theory, Jul. 2006, pp. 2784-2788.
Blaum, et al., "The EVENODD Code and its Generalization: An Efficient Scheme for Tolerating Multiple Disk Failures in RAID Architectures", Chapter 14, High Performance Mass Storage and Parallel I/O, 2002.
Gollakota, et al., "ZigZag Deoding: Combating Hidden Terminals in Wireless Networks", SIGCOMM, 2008, pp. 159-170.
Huang, et al., "STAR: An Efficient Coding Scheme for Correcting Triple Storage Node Failures", IEEE Transactions on Computers, vol. 57, No. 7, Jul. 2008, pp. 889-901.
Sung, et al., "ZigZag-Decodable Code with the MDS Property for Distributed Storage Systems", 2013 IEEE International Symposium on Information Theory, pp. 341-345.
Wang, et al., "Array BP-XOR Codes for Reliable Cloud Storage Systems", 2013 IEEE International Symposium on Information Theory, pp. 326-330.
Xu, et al., "Low-Density MDS Codes and Factors of Complete Graphs", IEEE Transactions on Information Theory, vol. 45, No. 6, Sep. 1999, pp. 1817-1826.
Xu, et al., "X-Code: MDS Array Codes with Optimal Encoding", IEEE Transactions on Information Theory, vol. 45., No. 1, Jan. 1999, pp. 272-276.
Burckhardt, et al. "Cloud Types for Eventual Consistency," LNCS, vol. 7313, 2012, pp. 283-307.
Chen, et al., "NCCloud: A Network-Coding-Based Storage System in a Cloud-of-Clouds", IEEE Trans. Computers, vol. 63, No. 1, pp. 31-44, Jan. 2014.
Dobre, et al., "Hybris: Robust Hybrid Cloud Storage", In Proc. of ACM SoCC, 2014, pp. 1-14.
Han, et al., "MetaSync: File Synchronization Across Multiple Untrusted Storage Services", In Proc. of USENIX Annual Technical Conf., 2015, pp. 83-95.
Jaatun, et al., "The design of a redundant array of independent net-storages for improved confidentiality in cloud computing", Journal of Cloud Computing [Online], 1(13). Available: https://link.springer.com/article/10.1186/2192-113X-1-13.
Lejeune, et al., "Service Level Agreement for Distributed Mutual Exclusion in Cloud Computing", In Proc. of IEEE/ACM Intl. Symp. on CCGrid, 2012, pp. 180-187.
Li, et al., "A Secure and Reliable Hybrid model for Cloud-of-Clouds Storage Systems", 2016 IEEE 22nd International Conference on Parallel and Distributed Systems (ICPADS), Wuhan, 2016, pp. 1157-1162, doi: 10.1109/ICPADS.2016.0152.
Non-Final Office Action on U.S. Appl. No. 16/779,233 dated Mar. 29, 2022.
Pottier, et al., "TrustyDrive, a Multi-Cloud Storage Service that Protects Your Privacy", 2016 IEEE 9th International Conference on Cloud Computing (CLOUD), San Francisco, CA, 2016, pp. 937-940, doi: 10.1109/CLOUD.2016.0140.
Sampaio, et al., "Uni4Cloud: An Approach based on Open Standards for Deployment and Management of Multi-cloud Applications", In Proc. of the 2nd Intl. Workshop on Software Engineering for Cloud Computing, 2011, pp. 15-21.
Schnjakin, et al., "Evaluation of Cloud—RAID: A Secure and Reliable Storage Above the Clouds", In Proc. IEEE Intl. Conf. on Computer Comm, and Net., 2013, pp. 1-9.
Seo, et al., "Mutual Exclusion Method in Client-Side Aggregation of Cloud Storage", in IEEE Transactions on Consumer Electronics, vol. 63, No. 2, pp. 185-190, May 2017, doi: 10.1109/TCE.2017.014838.
Shen, et al., "SpyStorage: A Highly Reliable Multi-Cloud Storage with Secure and Anonymous Data Sharing", 2017 International Conference on Networking, Architecture, and Storage (NAS), Shenzhen, 2017, pp. 1-6, doi: 10.1109/NAS.2017.8026878.
Song, et al., "SaveMe: Client-Side Aggregation of Cloud Storage", IEEE Trans. Consumer Electronics, vol. 61, No. 3, pp. 302-310, Aug. 2016.
Zhaoz, et al., "Deliverance from Trust through a Redundant Array of Independent Net-storages in Cloud Computing", In Proc. of IEEE Infocom 2011 Workshop on Cloud Computing, 2011, pp. 631-636.

* cited by examiner $$\begin{bmatrix} I_{d\times d} \\ Q \end{bmatrix} \times W^T = \begin{bmatrix} & & & I_{d\times d} & & \\ 1 & 1 & 1 & .. & 1 \\ 2^{d-1} & 2^{d-2} & 2^{d-3} & .. & 1 \\ 1 & 2^1 & 2^2 & .. & 2^{d-1} \\ 2^{2\times(d-1)} & 2^{2\times(d-2)} & 2^{2\times(d-3)} & .. & 1 \\ 1 & 2^2 & 2^4 & .. & 2^{2\times(d-1)} \\ \vdots & \vdots & \vdots & \vdots & \vdots \end{bmatrix}_{(d+p)\times d} \times \begin{bmatrix} X_0 \\ X_1 \\ X_2 \\ .. \\ X_{d-1} \end{bmatrix}_{d\times 1} = \begin{bmatrix} X_0 \\ X_1 \\ X_2 \\ .. \\ X_{d-1} \\ P_0 \\ P_1 \\ P_2 \\ P_3 \\ \vdots \\ P_{p-1} \end{bmatrix}$$

Figure 4

| D0 | D1 | D2 | D3 | D4 |
|----|----|----|----|----|
| $x_1$ | $x_2$ | $x_3$ | $x_4$ | $x_5$ |
| $y_1$ | $y_2$ | $y_3$ | $y_4$ | $y_5$ |
| $z_1$ | $z_2$ | $z_3$ | $z_4$ | $z_5$ |
| $h_1$ | $h_2$ | $h_3$ | $h_4$ | $h_5$ |

Figure 5

| P0 | P1 | P2 | P3 | P4 |
|---|---|---|---|---|
| $x_1 \oplus x_2 \oplus x_3 \oplus x_4 \oplus x_5$ | $x_1$ | $x_5$ | $x_1$ | $x_5$ |
| $y_1 \oplus y_2 \oplus y_3 \oplus y_4 \oplus y_5$ | $y_1 \oplus x_2$ | $x_4 \oplus y_5$ | $y_1$ | $y_5$ |
| $z_1 \oplus z_2 \oplus z_3 \oplus z_4 \oplus z_5$ | $z_1 \oplus y_2 \oplus x_3$ | $x_3 \oplus y_4 \oplus z_5$ | $z_1 \oplus x_2$ | $z_5 \oplus x_4$ |
| $h_1 \oplus h_2 \oplus h_3 \oplus h_4 \oplus h_5$ | $h_1 \oplus z_2 \oplus y_3 \oplus x_4$ | $x_2 \oplus y_3 \oplus z_4 \oplus h_5$ | $h_1 \oplus y_2$ | $h_5 \oplus y_4$ |
|  | $h_2 \oplus z_3 \oplus y_4 \oplus x_5$ | $x_1 \oplus y_2 \oplus z_3 \oplus h_4$ | $z_2 \oplus x_3$ | $z_4 \oplus x_3$ |
|  | $h_3 \oplus z_4 \oplus y_5$ | $y_1 \oplus z_2 \oplus h_3$ | $h_2 \oplus y_3$ | $h_4 \oplus y_3$ |
|  | $h_4 \oplus z_5$ | $z_1 \oplus h_2$ | $z_3 \oplus x_4$ | $z_3 \oplus x_2$ |
|  | $h_5$ | $h_1$ | $h_3 \oplus y_4$ | $h_3 \oplus y_2$ |
|  |  |  | $z_4 \oplus x_5$ | $z_2 \oplus x_1$ |
|  |  |  | $h_4 \oplus y_5$ | $h_2 \oplus y_1$ |
|  |  |  | $z_5$ | $z_1$ |
|  |  |  | $h_5$ | $h_1$ |

Figure 6

$$Q'^{-1} \times Y^T = \begin{bmatrix} X_0 \\ X_1 \\ X_2 \\ .. \\ X_{d-1} \end{bmatrix}$$

DATA STORAGE METHODS AND SYSTEMS

CROSS-REFERENCE TO RELATED APPLICATIONS

The present application is a non-provisional filing of and claims priority to U.S. Provisional Patent Application 62/799,634, titled "Efficient method for tolerating multiple failures of storage nodes" and filed on Jan. 31, 2019, which is incorporated herein by reference in its entirety.

FIELD

The present invention relates to data storage methods and systems. The present invention more particularly relates to distributed data storage methods and systems which allow data to be recovered in the event that there is a failure in one or more of the storage nodes.

BACKGROUND

Due to the unprecedented ever-growing amounts of generated data, computer systems that employ multiple storage nodes (such as in disc arrays or networked storage servers) for data storage are more popular than ever. Typically, these systems partition data into blocks and store these blocks over multiple storage nodes. When storing and processing huge amounts of data, striping data over independent storage nodes is not only mandatory but also has performance advantages.

In addition, more users are relying on the cloud to store their data. This makes data confidentiality and integrity critical requirements. However, relying on a single cloud storage provider fails to meet these requirements due to the inevitable risks of privacy, data leaks, and service failures. Thus, various multi-cloud storage systems are being proposed both in academia and in industry. Such systems may also offer performance and high-availability advantages.

However, a storage node or a cloud storage provider is often subject to occasional loss or service failure. Thus, the utilization of multiple storage nodes or multiple cloud storage providers has severe reliability and data availability implications since the unavailability of any participating node would prevent successful data access.

Computer systems that employ multiple parallel storage nodes for their data storage needs are known. These systems partition data into blocks and store these blocks over multiple storage nodes. However, nodes are often subject to occasional loss or corruption. The utilization of multiple storage nodes has severe reliability and data availability implications since the unavailability of any participating node would prevent successful data access. Therefore, as the number of storage nodes in a system increases, the failure frequency also increases.

There is a need for improved data storage methods and systems which seek to alleviate at least some of the problems described herein.

SUMMARY

According to one aspect of the present invention, there is provided a data storage method comprising: partitioning data into an array having a plurality of data blocks, wherein each data block is a column of elements of the data array; storing the plurality of data blocks across a plurality of storage nodes such that each storage node stores at least one of the data blocks; encoding a plurality of parity blocks based on the data array by: performing a shift operation on the data array to produce a shifted array comprising a plurality of rows, each row having the elements of a diagonal of the data array; and performing an exclusive OR (XOR) operation on the elements in each row of the shifted array to produce a parity block, wherein the method further comprises: storing the parity blocks across a plurality of the storage nodes, wherein decoding at least some of the parity blocks permits at least a portion of the data array to be recovered in the event that at least some of the data blocks are not accessible.

In some embodiments, the plurality of storage nodes comprise at least one storage node which is in the cloud.

In some embodiments, the method further comprises: partitioning the data into an array having a greater number of data blocks than the number of storage nodes; grouping the data blocks into a plurality of data block groups, wherein each data block group consists of a plurality of the data blocks; and storing each data block group across a plurality of the storage nodes, such that the data blocks of each data block group are striped across a plurality of the storage nodes.

In some embodiments, the method further comprises: encoding a parity block based on the data blocks in each data block group.

In some embodiments, encoding the plurality of parity blocks (P) based on the data array (X) comprises performing a multiplication operation in accordance with this equation:

$$\begin{bmatrix} I_{d \times d} \\ Q \end{bmatrix} \times W^T =$$

$$\begin{bmatrix} & & & I_{d \times d} & & \\ 1 & 1 & 1 & \cdots & 1 \\ 2^{d-1} & 2^{d-2} & 2^{d-3} & \cdots & 1 \\ 1 & 2^1 & 2^2 & \cdots & 2^{d-1} \\ 2^{2 \times (d-1)} & 2^{2 \times (d-2)} & 2^{2 \times (d-3)} & \cdots & 1 \\ 1 & 2^2 & 2^4 & \cdots & 2^{2 \times (d-1)} \\ \vdots & \vdots & \vdots & \vdots & \vdots \end{bmatrix}_{(d+p) \times d} \times \begin{bmatrix} X_0 \\ X_1 \\ X_2 \\ \cdots \\ X_{d-1} \end{bmatrix}_{d \times 1} = \begin{bmatrix} X_0 \\ X_1 \\ X_2 \\ \cdots \\ X_{d-1} \\ P_0 \\ P_1 \\ P_2 \\ P_3 \\ \vdots \\ P_{p-1} \end{bmatrix}$$

In some embodiments, encoding the plurality of parity blocks utilises only XOR operations.

In some embodiments, each data block and each parity block is represented by a polynomial with each element being a coefficient of the polynomial.

In some embodiments, the method further comprises: encrypting at least one of the data blocks using an encryption key.

In some embodiments, the method further comprises: compressing at least one of the data blocks.

In some embodiments, the method comprises performing the XOR operations simultaneously in parallel across a plurality of processing devices.

According to another aspect of the present invention, there is provided a method for recovering data from a data array in the event that the data array is inaccessible, wherein the method comprises:
  a) receiving a plurality of parity blocks which at least partly correspond to the data array;
  b) selecting a candidate element of the data array for recovery;

c) identifying at least one diagonal slope between the candidate element and at least one adjacent element in the data array;

d) selecting a parity block from the plurality of parity blocks which corresponds to the identified diagonal slope; and e) processing the selected parity block by performing an XOR operation on the selected parity block to recover the data of the candidate element from the selected parity block.

In some embodiments, the method further comprises:

f) repeating operations b)-e) for each element in the data array until all data in the data array is recovered.

In some embodiments, the method further comprises: using at least some of the parity blocks (P) to recover the data array (X) by performing a multiplication operation in accordance with this equation:

$$Q'^{-1} \times Y^T = \begin{bmatrix} X_0 \\ X_1 \\ X_2 \\ \ldots \\ X_{d-1} \end{bmatrix}$$

where $Y^T$ is the column vector consisting of the d available blocks from the set of data and parity blocks $\{X_0, X_1, \ldots, X_d, P_0, P_1, \ldots, P_p\}$, and $Q'^{-1}$ is the left inverse of the matrix Q' constructed from the matrix $$\begin{bmatrix} I_{d \times d} \\ Q \end{bmatrix},$$

used in the encoding process, by selecting the d rows corresponding to available blocks.

In some embodiments, processing the selected parity block utilises only XOR operations.

In some embodiments, the method comprises performing the XOR operations simultaneously in parallel across a plurality of processing devices.

According to another aspect of the present invention, there is provided a data storage system comprising: a processor; and a memory, wherein the system is configured to: partition data into an array having a plurality of data blocks, wherein each data block is a column of elements of the data array; store the plurality of data blocks across a plurality of storage nodes such that each storage node stores at least one of the data blocks; encode a plurality of parity blocks based on the data array by: performing a shift operation on the data array to produce a shifted array comprising a plurality of rows, each row having the elements of a diagonal of the data array; and performing an exclusive OR (XOR) operation on the elements in each row of the shifted array to produce a parity block, wherein the system is further configured to: store the parity blocks across a plurality of the storage nodes, wherein decoding at least some of the parity blocks permits at least a portion of the data array to be recovered in the event that at least some of the data blocks are not accessible.

In some embodiments, the system further comprises: a plurality of storage nodes, at least one of the storage nodes being in the cloud.

In some embodiments, the system further comprises: an XOR processing module which is coupled to the processor, the XOR processing module being configured to only execute XOR processing operations.

In some embodiments, the system further comprises: an encryption module which is configured to encrypt at least one of the data blocks using an encryption key.

According to another aspect of the present invention, there is provided a system for recovering data from a data array in the event that the data array is inaccessible, wherein the system comprises: a processor; and a memory, wherein the system is configured to:

a) receive a plurality of parity blocks which at least partly correspond to the data array;

b) select the candidate element of the data array for recovery;

c) identify at least one diagonal slope between the candidate element and at least one adjacent element in the data array;

d) select a parity block from the plurality of parity blocks which corresponds to the identified diagonal slope; and e) process the selected parity block by performing an XOR operation on the selected parity block to recover the data of the candidate element from the selected parity block.

In some embodiments, the system is further configured to:

f) repeat operations b)-e) for each element in the data array until all data in the data array is recovered.

According to another aspect of the present invention, there is provided a computer-readable medium storing executable instructions which, when executed by a computing device, cause the computing device to: partition data into an array having a plurality of data blocks, wherein each data block is a column of elements of the data array; store the plurality of data blocks across a plurality of storage nodes such that each storage node stores at least one of the data blocks; encode a plurality of parity blocks based on the data array by: performing a shift operation on the data array to produce a shifted array comprising a plurality of rows, each row having the elements of a diagonal of the data array; and performing an exclusive OR (XOR) operation on the elements in each row of the shifted array to produce a parity block, wherein the system is further configured to: store the parity blocks across a plurality of the storage nodes, wherein decoding at least some of the parity blocks permits at least a portion of the data array to be recovered in the event that at least some of the data blocks are not accessible.

According to another aspect of the present invention, there is provided a computer-readable medium storing executable instructions which, when executed by a computing device, cause the computing device to:

a) receive a plurality of parity blocks which at least partly correspond to the data array;

b) select a candidate element of the data array for recovery;

c) identify at least one diagonal slope between the candidate element and at least one adjacent element in the data array;

d) select a parity block from the plurality of parity blocks which corresponds to the identified diagonal slope; and e) process the selected parity block by performing an XOR operation on the selected parity block to recover the data of the candidate element from the selected parity block.

BRIEF DESCRIPTION OF THE DRAWINGS

So that the present invention may be more readily understood, embodiments of the present invention will now be described, by way of example, with reference to the accompanying drawings, in which:

FIG. 4 is an encoding equation of some embodiments, FIG. 5 is a data array of one example, FIG. 6 is a table of parity blocks of one example, FIG. 7 is a decoding equation of some embodiments, FIG. 13 is part of a data array of one example, FIG. 14 is part of a data array of one example, FIG. 15 is part of a data array of one example, FIG. 16 is a complete data array of one example.

DETAILED DESCRIPTION

Figure 1:
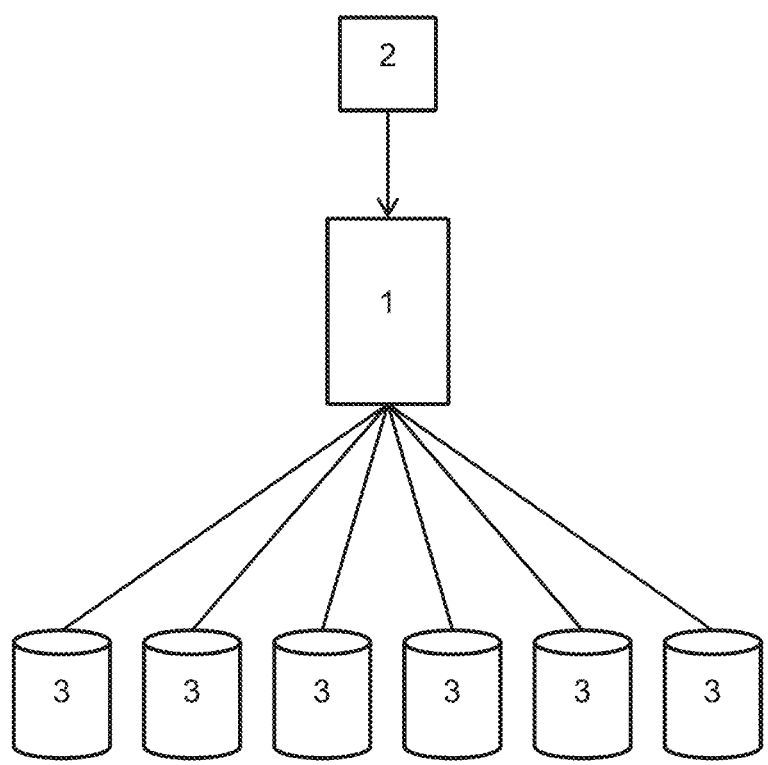
FIG. 1 is a schematic diagram of a storage system of some embodiments.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

The following disclosure provides many different embodiments, or examples, for implementing different features of the provided subject matter. Specific examples of components, concentrations, applications and arrangements are described below to simplify the present disclosure. These are, of course, merely examples and are not intended to be limiting. For example, the attachment of a first feature and a second feature in the description that follows may include embodiments in which the first feature and the second feature are attached in direct contact, and may also include embodiments in which additional features may be positioned between the first feature and the second feature, such that the first feature and the second feature may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In general, as the number of storage nodes in a data storage system increases, the mean-time-between-failures of the system dramatically decreases. Such systems typically employ data replication or error-correcting codes to tolerate multiple storage node failures in order to enhance the reliability and availability of the system. Coding techniques can be used to ensure that storage systems become much more reliable than individual storage nodes.

In the following description, methods and systems of some embodiments are described which use a new coding technique that can be efficiently used for tolerating any number of storage node failures. The methods and systems of some embodiments also allow efficient small write operations. Furthermore, the methods and systems of some embodiments do not impose limitations on the size of a data array which is to be stored or on the layout of parity data derived from the data array. In the methods and systems of some embodiments, adding and removing storage nodes is simple and efficient. The coding technique used with some embodiments only requires a small, negligible amount of additional redundancy overhead beyond the theoretically optimal amount of redundancy achieved by MDS (Minimum Distance Separable) codes. The methods and systems of some embodiments use simple exclusive OR (XOR) operations, making implementation easy and efficient in software and/or hardware.

The data storage system and method of some embodiments is for use with any type of data storage system. Such data storage systems are selected from a group including, but not limited to:

Redundant Arrays of Independent Disks (RAID)

RAID systems are now widespread not only across enterprise but also in many consumer aimed storage products. RAID systems rely on coding techniques. Thus, the system and method of some embodiments can be utilized to design and build fast, reliable, and efficient RAID storage systems.

Distributed Data Storage Systems (e.g. Distributed File Systems)

Distributed storage system, such as the Distributed File Systems (DFS), store data and metadata over multiple locations and servers. Such distributed storage systems can implement the system and method of some embodiments in order to tolerate failures that might occur in different locations or servers.

Multi-Cloud Storage Systems

The system and method of some embodiments is configured for use with any multi-cloud storage system where each cloud storage service in the multi-cloud storage (e.g. Dropbox™, Google Drive™, Box™, etc.) is considered to be a storage node. In these embodiments, the storage nodes comprise at least one storage node which is in the cloud. Implementing the system and method of some embodiments with a multi-cloud storage system seeks to produce a reliable and secure cloud storage platform.

Memory Systems

Error Correcting Codes Random Access Memory (EEC RAM) is used in modern computing devices to provide high reliability systems. Data stored in RAM is essential for the operating system of a device to function normally. The error correcting coding in ECC RAM decreases the chance of critical system failures, such as system collapse due to errors or loss of data stored in the RAM. The system and method of some embodiments is configured to be implemented in ECC RAM to seek to provide more robust RAM storage and consequently more stable operating systems.

Backup and Disaster Recovery Applications

The system and method of some embodiments is configured for use with backup and disaster recovery applications which store multiple backup copies of data and utilize erasure codes to minimize the possibility of data loss.

Communication Systems

The system and method of some embodiments is configured for error detection and correction and network coding in a communication system.

Referring to FIG. 1 of the accompanying drawings, a data storage system 1 of some embodiments is a computing device or server which is configured to receive and process inputted data 2. The data storage system 1 is coupled for communication with a plurality of storage nodes 3 so that the data storage system 1 can transmit data to the storage nodes 3 for the data to be stored across at least some of the storage nodes 3. As discussed above, the storage nodes 3 may be any type of data storage. In some embodiments, the storage nodes 3 are cloud storage systems which are connected to the data storage system 1 via a network, such as the Internet. In other embodiments, the storage nodes 3 are local memory, hard discs or RAM.

Figure 2:
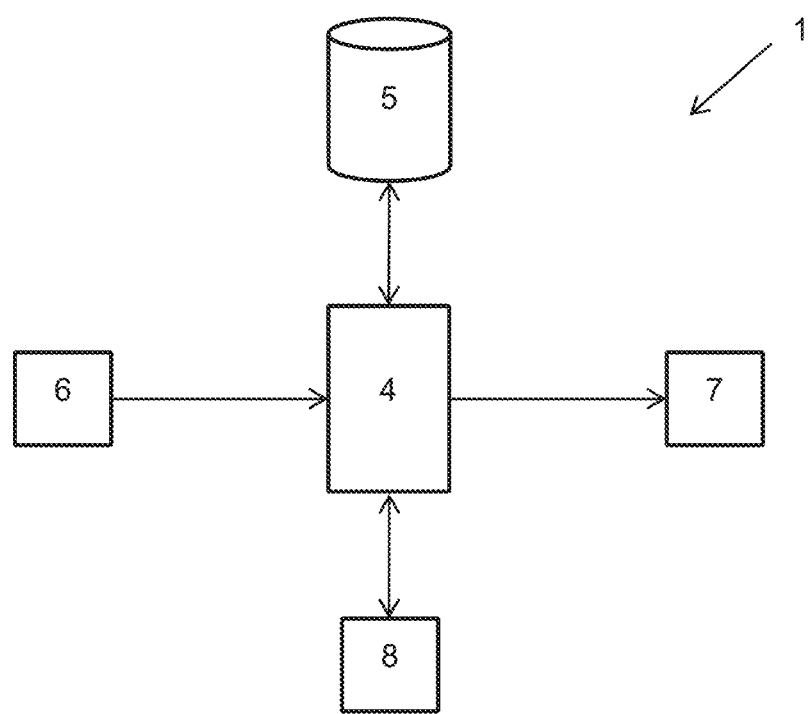
FIG. 2 is a schematic diagram of part of a storage system of some embodiments.

Referring now to FIG. 2 of the accompanying drawings, the data storage system 1 of some embodiments comprises a central processing unit 4 and a memory 5. The memory 5 stores executable code which is processed by the central processing unit 4.

The system 1 further comprises a data input module 6 which is configured to receive data which is to be processed by the data storage system 1. The system 1 further comprises a data output module 7 which is configured to output data which has been processed by the system 1 to the storage nodes 3.

The system 1 of some embodiments further comprises an XOR processing module 8 which is coupled to the central processing unit 4. In some embodiments, the XOR processing module 8 is implemented by executable code which is executed by the central processing unit 4 in order to execute XOR processing operations. In some embodiments, the XOR processing module 8 is configured to solely perform XOR processing operations.

Figure 3:
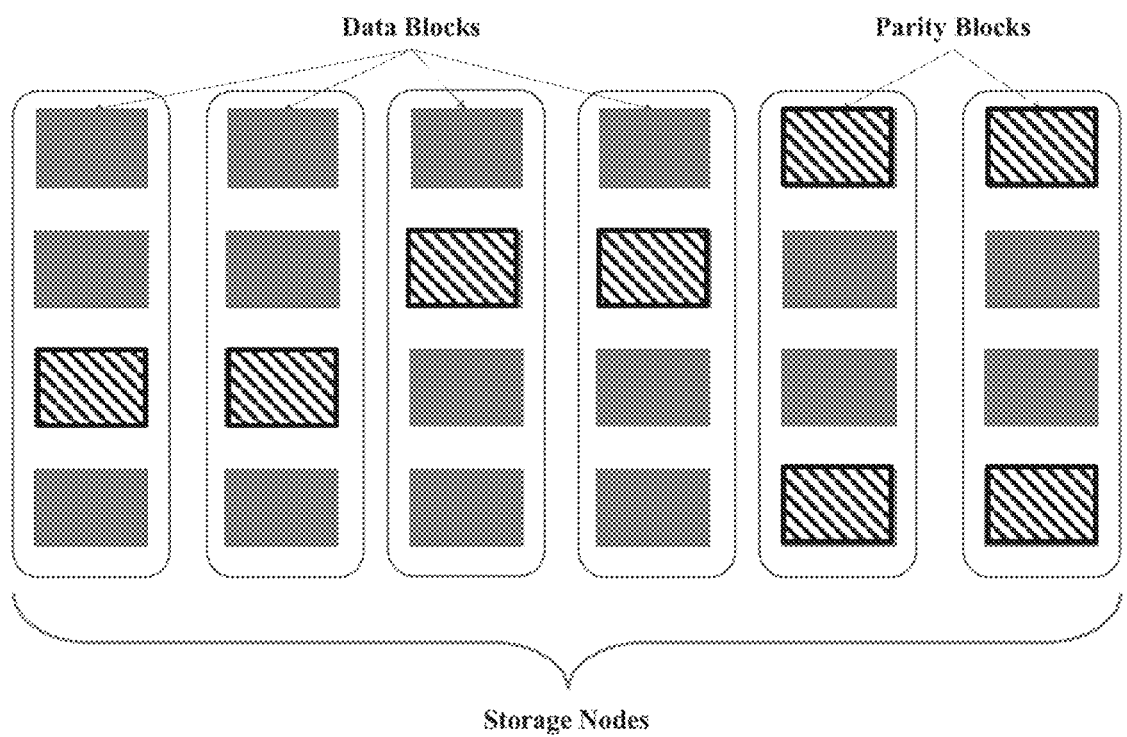
FIG. 3 is a schematic diagram showing data blocks and parity blocks stored across a plurality of storage nodes of some embodiments.

Referring now to FIG. 3 of the accompanying drawings, the storage methods and systems of some embodiments are configured to store data blocks and parity blocks across a plurality of storage nodes 3. This provides redundancy to enable the data blocks to be recreated using the parity blocks in the event that one or more of the data blocks are inaccessible (e.g. due to the failure of a storage node 3).

The systems and methods of some embodiments are configured to distribute the parity blocks across a plurality of the storage nodes. In some embodiments, the parity blocks are updated with every write operation. Storing the parity blocks across a plurality of the storage nodes avoids a processing and storage bottleneck which would occur if the parity blocks were all stored by dedicated parity storage nodes.

The system 1 of some embodiments is configured to partition data into an array consisting of a plurality of data blocks, wherein each data block is a column of elements of the data array. The system is configured to store the plurality of data blocks across a plurality of storage nodes such that each storage node stores at least one of the data blocks.

The system 1 of some embodiments is configured to encode a plurality of parity blocks based on the data array by performing a shift operation on the data array to produce a shifted array comprising a plurality of rows, each row consisting of the elements of a diagonal of the data array. The system 1 performs an exclusive OR (XOR) operation on the elements in each row of the shifted array to produce a parity block. This configuration of the system 1 will become clear from the description below which describes how the system processes the data array to encode the parity blocks.

The system is further configured to store the parity blocks across a plurality of the storage nodes, wherein decoding at least some of the parity blocks permits at least a portion of the data array to be recovered in the event that at least some of the data blocks are not accessible.

The system of some embodiments is configured to partition data into an array consisting of a greater number of data blocks than the number of storage nodes. In these embodiments, the system is configured to group the data blocks into a plurality of data block groups, wherein each data block group consists of a plurality of the data blocks. The system then stores each data block group across a plurality of the storage nodes, such that the data blocks of each data block group are striped across a plurality of the storage nodes, as shown in FIG. 3. The system of some embodiments is configured to encode a parity block based on the data blocks in each data block group.

The systems and methods of some embodiments utilize the coding technique described herein to seek to provide a secure, reliable, efficient, and highly performing cloud storage system.

The system of some embodiments is configured for recovering data from a data array in the event that the data array is at least partly inaccessible. In these embodiments, the system is configured to:
a) receive a plurality of parity blocks which at least partly correspond to the data array;
b) select a candidate element of the data array for recovery;
c) identify at least one diagonal slope between the candidate element and at least one adjacent element in the data array;
d) select a parity block from the plurality of parity blocks which corresponds to the identified diagonal slope; and
e) process the selected parity block by performing an XOR operation of array elements along the selected diagonal slope to recover the data of the candidate element from the selected parity block.

In some embodiments, the system is further configured to:
f) repeat operations b)-e) above for each element in the data array until all data in the data array is recovered.

The systems and methods of some embodiments partition data using innovative coding techniques and then encrypt and distribute it among multiple cloud storage providers. This approach seeks to bring at least some of the following key benefits to cloud storage services:

Data Privacy:

Since each part of the data in the system is stored on a separate cloud storage provider, there is no single cloud provider that can retrieve, use, or view the full data of a user. Furthermore, in some embodiments all data parts and metadata are encrypted before they are sent to cloud providers.

System Security:

In some embodiments, the system comprises an encryption module which is configured to encrypt at least one of the data blocks of a data array using an encryption key. In some embodiments, the system is configured to compress at least one of the data blocks in addition to or instead of encrypting the or each data block.

Data Availability:

Efficient [d+p, d] erasure code is used such that data is partitioned into n+t parts consisting of n data parts and t parity parts. Even if up to p providers fail or stop to provide the service for any reason, the data can still be retrieved from any remaining d providers, which ensures data availability and reliability of the proposed file system. Erasure codes are much more space effective, cost effective and convenient compared to duplicating all of the data on each cloud provider. The algorithm of some embodiments seeks to provide these improvements in efficiency and reliability.

RAID and multi-cloud storage systems that are based on erasure codes will always be more storage efficient and cost effective than RAID and storage systems that are based on data replication. In addition, optimizations on coding techniques are possible and can improve the performance of the writes/reads/data recovery operations. Thus, whenever the efficiency of storage space and cost are prioritized, an erasure codes-based system will be the best option while also providing the required performance.

The system and method of some embodiments can tolerate any number of storage node failures. The system and method can be extended systematically and easily to achieve the desired level of fault tolerance while also being efficient in read/write operations. Further, in some embodiments the encoding and decoding processes are solely or totally based on XOR operations. This allows the proposed array codes to achieve maximum performance and run on cost effective hardware. The method does not impose limitations on the size of the array or the layout of parity data. Therefore, adding and removing storage nodes is simple and efficient. These codes require a small negligible amount of extra redundancy overhead beyond the overhead of basic MDS codes.

Reordering the Steps:

Some of steps of the disclosed algorithm depend on preceding steps, other steps do not. Therefore, a number of variations in ordering these steps is feasible in other embodiments.

Starting from the Bottom Row Instead of the Top Row:

In some embodiments an algorithm that starts at the bottom of the missing array is used.

Fixed Maximum Fault Tolerance:

The method and system of some embodiments utilizes a general algorithm that can be used to tolerate any number of failures.

Other Variations:

There are variations of implementing and interpreting the same non-MDS code. For example, coding and decoding can be interpreted as matrix operations or as polynomial arithmetic.

In some embodiment, each data or parity column is a polynomial Q(z) with the column elements being the coefficients of the polynomial. In these embodiments, a diagonal parity is computed by shifting the columns and performing the XOR operations. Shifting a column corresponds to Q(z) by s positions can be achieved by multiplying Q(z) by $z^s$.

General:

The coding method of some embodiments is general and can tolerate any number of failing storage nodes. The tolerance is not limited to a specific number of nodes.

Easily Extensible:

The extension of the tolerance capacity of the method of some embodiments is simple and systematic in contrary to other general error-correcting codes which require more complex computations for tolerating more storage nodes failures.

In the proposed coding technique of some embodiments, adding more parity columns to tolerate more failures requires performing the same simple non-cyclic diagonal parity but with different slopes. Thus, the method can be efficiently extended to tolerate any number of failures.

Efficient Reads:

A read operation requires access to only data servers if no failure has occurred. Further, even if node failures occurred, data parity nodes can be retrieved to decode the unavailable data. The decoding process of some embodiments is fully or solely based on XOR operations which can be easily parallelized and performed in very high speeds.

Efficient Writes:

The algorithm of some embodiments provides the ability to perform small writes in an effective manner. Each element in a parity block is computed by XORing other elements in data blocks. On a small write, instead of re-computing the new parity block from scratch, the new parity block is computed by (1) reading the old parity, (2) reading the old data block which is being written, (3) using the diagonal associated with the parity block to apply an XOR operation between elements of the old parity block, old data block, and new data block. Using this approach, a small write operation would require p+1 reads and p+1 writes. Since in practice p is much smaller than d, this approach would enhance the small write performance.

Efficient Reconfiguration:

The coding technique of some embodiments can dynamically remove and add data or parity storage nodes. Adding more parity nodes will only imply calculating diagonal parities of different slopes, adding or removing more data nodes (changing the shape of the data array) only require performing XOR operations of the newly added data nodes with existing parity nodes.

The encoding and decoding processes which are performed in accordance with some embodiments are described below. The processing is performed by the data storage system 1 and/or by the XOR processing module 8.

Encoding Process

The encoding process calculates parity blocks based on input data blocks. The encoding process may be represented by a matrix operation as shown in FIG. 4 of the accompanying drawings. Encoding the plurality of parity blocks (P) based on the data array (X) comprises performing a multiplication operation in accordance with this equation (the powers of 2 in matrix Q are performed mod b and the addition operation is the bitwise XOR operation).

Let D be the data array whose elements are $x_{i,j}$. If each column of this data array is denoted by $X_j$, then $X_j$ will be a long binary number.

The multiplication operation will perform the encoding process of the proposed algorithm of some embodiments. The multiplication performs the necessary shifts and the addition (XOR) calculates the parity along the diagonals formed by the shifts.

Where $P_0$ is the parity column that corresponds to slope 0 (horizontal parity), $P_1$ is the parity column that corresponds to slope 1, $P_2$ is the parity column that corresponds to slope−1, $P_3$ is the parity column that corresponds to slope 2, $P_3$ is the parity column that corresponds to slope−2 and so on.

The encoding process of some embodiments is described more generally as follows.

Let W be a two dimensional array of size b×d that represent the data blocks. P is a two dimensional array of size p×d that represent parity blocks, where:
b=number of elements in a data block
d=number of data blocks in the data array
p=number of parity blocks in the parity array P To compute the first parity block $P_0$, use the simple horizontal parity.

To compute the second and third parity blocks $P_1$ and $P_2$, use diagonal parity of slopes +1 and −1, respectively.

To compute the fourth and fifth parity blocks $P_3$ and $P_4$, use diagonal parity of slopes +2 and −2, respectively.

To compute the parity column $P_x$, if x is even then the diagonal slope should be $$-\frac{x}{2},$$

else the slope should be $$\frac{x+1}{2}.$$

The size of the parity column which is calculated using slope s is $b+|s|(d-1)$.

Encoding Example

Consider the simple b×d data array W shown in FIG. 5 of the accompanying drawings.

To be able to tolerate a five column erasure from the data array W, five parity blocks are stored. The parity blocks are calculated using the encoding process described above. The XOR operations to produce the parity blocks are shown in the parity matrix in FIG. 6 of the accompanying drawings.

Decoding Process

The decoding process reconstructs the data blocks by using at least some of the parity blocks. Reconstructing n missing blocks requires the use of n parity blocks. The decoding process may be represented by a matrix operation as shown in FIG. 7 of the accompanying drawings.

The method of some embodiments uses at least some of the parity blocks (P) to recover the data array (X) by performing a multiplication operation in accordance with the equation shown in FIG. 7, where $Y^T$ is the column vector consisting of the d available blocks from the set of data and parity blocks $\{X_0, X_1, \ldots, X_d, P_0, P_1, \ldots, P_p\}$, and $Q'^{-1}$ is the left inverse of the matrix Q' constructed from the matrix $$\begin{bmatrix} I_{d \times d} \\ Q \end{bmatrix},$$

used in the encoding process, by selecting the d rows corresponding to available blocks. In performing the matrix multiplication, the bitwise XOR operation is used for the addition operation.

The multiplication operation shown in FIG. 7 performs the decoding process of the proposed algorithm of some embodiments. The original data blocks $[X_0 \ldots X_{d-1}]$ can be calculated through the equation by calculating an inverse and then performing a matrix multiplication.

The decoding process of some embodiments is described more generally as follows.

Let X be the matrix of missing columns.

Let S be an array of the slopes that correspond to the available parity columns sorted in descending order.

Decoding Algorithm for Contiguous Lost Data Columns:

1. Compute the Upper Left Triangle of X:

Defining the Upper Left Triangle:

Let S[k] be the smallest positive slope in array S at index k, the upper left triangle consists of S[k] element in column k of matrix X, S[k]+S[k−1] elements in columns k−1 of matrix X, S[k]+S[k−1]+S[k−2] in column k−2 of matrix X, and so on until reaching column 0 of matrix X. In general, the upper left triangle has $\Sigma_{i=c}^{k} S[i]$ elements in column c.

Calculating Elements in the Upper Left Triangle:

Find the top S[j] elements of each column j such that S[j]>0 (i.e. the column is associated with positive slope) by executing the following steps starting from row r=0 and column 0.

Compute the element X[r][j] using slope S[j]:

Computing the element X[r][j] is always possible because when r<S[j] the diagonal of slope S[j] passing through the element X[r] [j] has no elements to the right of X[r][j]. Also, all elements to the left of X[r][j], which are on the diagonal of slope S[j] passing through X[r] [j], would have already been computed from the previous iteration since S[j]<S[j−1]. Thus, X[r][j] will always be the only missing element along a diagonal parity making its computation always feasible.

Perform a right-to-left-sweep using X[r][j] as a pivot:

A sweep uses the pivot element to compute an additional element of every column to the right or to the left of the pivot element. For example, if X[r][j] is the pivot element, a right to left sweep uses the diagonal of slope S[j−1] going through the pivot to calculate the element X[r+S[j−1]][j−1]. Then, the diagonal of slope S[j−2] going through this last calculated element (X[r+S[j−1]][j−1]) to calculate X[r+S[j−1]+S[j−2]][j−2]. Then, the diagonal of slope S[j−3] that passes through this last calculated element (X[r+S[j−1]+S[j−2]][j−1]) is used to calculate X[r+S[j−1]+S[j−2]+S[j−3]][j−3] and so on until reaching row 0.

A left-to-right-sweep performs a similar task but in the other direction (using the negative slopes.

Move to the next row (r=r+1)

2. Compute the Upper Right Triangle of X:

The upper-right triangle is very similar to the upper-left triangle but uses negative slopes, starts at the last column of X and moves in the opposite direction while performing left to right sweep operations.

3. Repeat the Following for Each Row r of Matrix X

If $P_1$ is among the available parity blocks

Use $P_0$ to compute the remaining element [r][j+1] in row r where j is the last column index of the upper left triangle.

Set Left-Sweep-Pivot (LSP)=X[r][j+1]

Set Right-Sweep-Pivot (RSP)=X[r][j+1]

Else there are two pivot columns

Set RSP=X[r][j], where j is the last column index of the upper left triangle

Set LSP=X[r][k], where k is the first column in the upper-right triangle

Starting at LSP, perform a right-to-left-sweep computing an additional element on every column to the left of the pivot (the sweep operation is explained in step 2)

Starting at the RSP, perform a left-to-right-sweep computing an additional element on every column to the right of the pivot Generalization for Non-Contiguous Lost Data Columns:

The previous steps hold when the lost data columns are contiguous in the array W. If the lost data column are not contiguous, the first two steps (calculating the upper left and right triangle) are slightly different:

Let the distance between two non-contiguous columns be $d_{j,j+1}$ (i.e, $d_{j,j+1}$ is the index of column X[j+1] in W minus the index of column X[j] in W), it would be possible to compute $d_{j,j+1}-|S[j]|$ elements in column j. Therefore, the steps to compute the upper-left triangle when the columns of X are not contiguous are:

Starting at column 0, repeat the following steps for every column j such that [j]>0:

Find the top $d_{j,j+1} \times |S[j]|$ elements of column j by executing the following steps:

1. Compute the element X[r][j] using slope S[j]
2. Perform a right-to-left-sweep using X[r][j] as a pivot
3. Move to the next row (r=r+1)

Move to the next column (j=j+1)

Therefore, the upper-left triangle now consists of $\Sigma_{i=c}^{k} d_{i,i+1} \times |S[i]|$ elements in each column c. As stated earlier, the upper-right triangle is very similar to the upper-left triangle but uses negative slopes, starts at the last column of X and moves in the opposite direction.

Decoding Example:

Consider the data and parity arrays shown in FIG. 5 and FIG. 6. Assume that the data columns D0 . . . D4 are lost. The decoding process will be done as described above according to the previously presented decoding steps.

1. Compute the Upper Left Triangle:

Since 1 is the smallest available positive slope, the upper left triangle consists of 1 element in column 1 and 1+2=3 elements in column 0.

Figure 8:
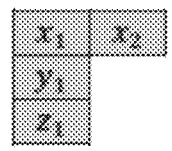
FIG. 8 is part of a data array of one example.

The elements that form the upper left triangle are shown in FIG. 8.

To compute the upper left triangle, we first define S, the array of slopes of available parity blocks in descending order, S=[+2, +1, 0, −1, −2]. Notice that we need 5 parity blocks to recover the 5 unavailable data blocks.

Figure 9:
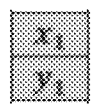
FIG. 9 is part of a data array of one example.

In column 0, compute the top S[0]=2 elements by using $P_3$ (corresponding to slope +2) to compute the elements shown in FIG. 9.

A sweep operation is not necessary since we are already at column 0

Figure 10:
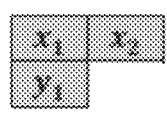
FIG. 10 is part of a data array of one example.

In column 1, compute the top S[1]=1 elements by using $P_1$ to compute the elements shown in FIG. 10

Figure 11:
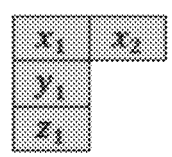
FIG. 11 is part of a data array of one example.

Using element $x_2$ as a pivot, and performing a right-to-left sweep, the parity column that corresponds to slope S[1−1]=S[0]=2 is used to find the element at indices i=0+2, j=1−1=0 (i.e. $z_1$) to compute the elements shown in FIG. 11. Now, all elements of the upper left triangle are found.

2. Compute the Upper Right Triangle:

The upper right triangle is calculated using an equivalent process to the process described above for the upper left triangle.

Figure 12:
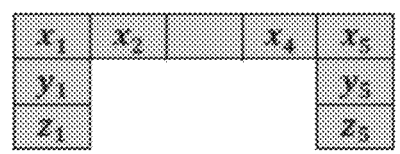
FIG. 12 is part of a data array of one example.

The upper left and upper right triangles are shown in FIG. 12.

3. For Each Row in the Matrix, Repeat the Following:

Compute the remaining element in the row (i.e. $x_3$) using $P_0$ to compute the elements shown in FIG. 13

Considering $x_3$ as a pivot, perform right to left sweep:
Calculate $y_2$ using $x_3$ and the diagonal of slope 1
Calculate $h_1$ using $y_2$ and diagonal of slope 2 to compute the elements shown in FIG. 14

Considering $x_3$ as a pivot, perform left to right sweep:
Calculate $y_4$ using $x_3$ and the diagonal of slope−1
Calculate $h_4$ using $y_4$ and diagonal of slope−2 to compute the elements shown in FIG. 15

Repeat operation 3 above for the second row (i.e. by starting with calculating $y_3$ and then performing the sweep operations) until all elements of matrix X are calculated, as shown in FIG. 16.

Figure 17:
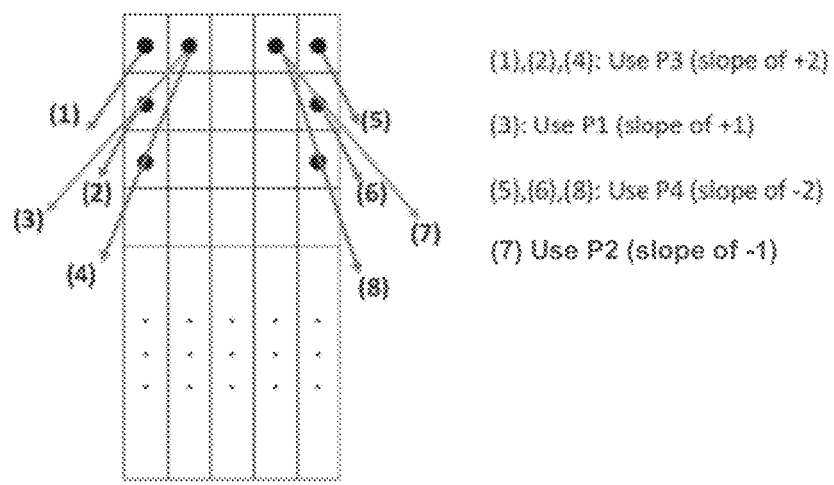
FIG. 17 is a diagram illustrating a decoding operation of some embodiments.
Figure 18:
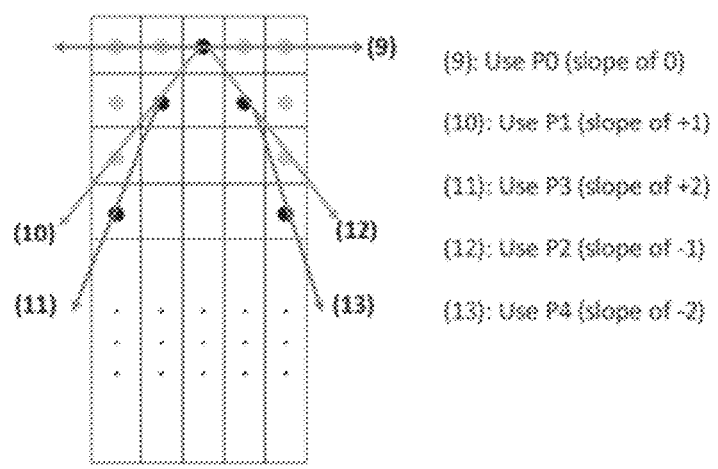
FIG. 18 is a diagram illustrating a decoding operation of some embodiments.
Figure 19:
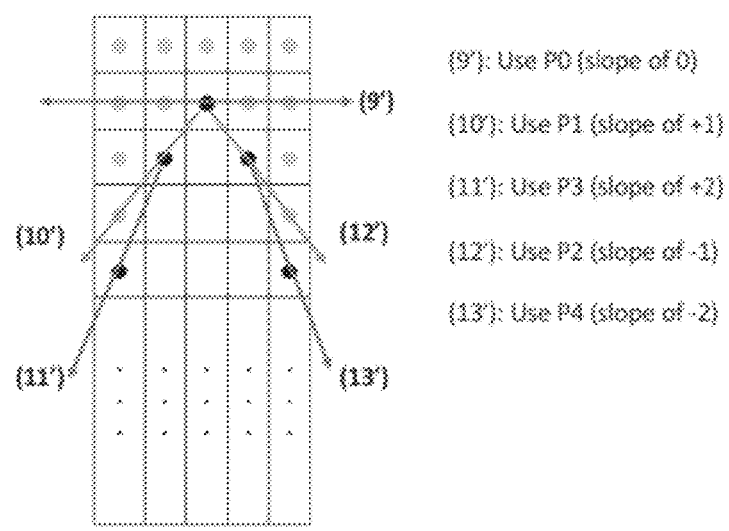
FIG. 19 is a diagram illustrating a decoding operation of some embodiments.

The decoding process described above is illustrated more generally in FIGS. 17-19 of the accompanying drawings. After forming the upper left and upper right triangles in the first operation (FIG. 17), the pivot element in row 0 is computed and sweep operations are done in the second operation (FIG. 18). Then, the pivot element in row 1 is computed and sweep operations are done in the third operation (FIG. 19). Further operations which are similar to the second and third operations (finding the pivot and performing sweeps) are performed until all elements of the array are found.

Performance of the Encoding the Decoding Algorithms:

Let:
b=number of words in a data block (rows in the data array)
d=number of data columns in the array
p=number of parity columns The number of XOR operations needed to compute a parity of slope s is (d−1)×(b−|s|). Therefore, the total number of XOR operations needed to compute p parity blocks is $$(d-1) \times \left(bp - \frac{p^2 + 2p}{4}\right)$$

if p is even, and $$(d-1) \times \left(bp - \frac{p^2 + 2p + 1}{4}\right)$$

if p is odd. Therefore, the number of required XOR operations is <(d−1)bp. Similarly we can show that the maximum number of XOR operations needed to decode an unavailable data block is <(d−1)b.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described features (e.g., elements, resources, etc.), the terms used to describe such features are intended to correspond, unless otherwise indicated, to any features which performs the specified function of the described features (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

Embodiments of the subject matter and the functional operations described herein can be implemented in digital electronic circuitry, or in computer software, firmware, or hardware, including the structures disclosed in this specification and their structural equivalents, or in combinations of one or more of them.

Some embodiments are implemented using one or more modules of computer program instructions encoded on a computer-readable medium for execution by, or to control the operation of, a data processing apparatus. The computer-readable medium can be a manufactured product, such as hard drive in a computer system or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The terms "computing device" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks.

To provide for interaction with a user, some embodiments are implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:
1. A data storage method comprising:
partitioning data into an array consisting of a plurality of data blocks, wherein each data block of the plurality of data blocks is a column of elements of the data array;
storing the plurality of data blocks across a plurality of storage nodes such that each storage node stores at least one data block of the plurality of data blocks;

encoding a parity array (P) comprising a plurality of parity blocks based on the data array by:
performing a matrix multiplication operation in accordance with this equation:

$$\begin{bmatrix} I_{d \times d} \\ Q \end{bmatrix} \times W^T =$$

$$\begin{bmatrix} & & & I_{d \times d} & & \\ 1 & 1 & 1 & \ldots & 1 \\ 2^{d-1} & 2^{d-2} & 2^{d-3} & \ldots & 1 \\ 1 & 2^1 & 2^2 & \ldots & 2^{d-1} \\ 2^{2 \times (d-1)} & 2^{2 \times (d-2)} & 2^{2 \times (d-3)} & \ldots & 1 \\ 1 & 2^2 & 2^4 & \ldots & 2^{2 \times (d-1)} \\ \vdots & \vdots & \vdots & \vdots & \vdots \end{bmatrix}_{(d+p) \times d} \times \begin{bmatrix} X_0 \\ X_1 \\ X_2 \\ \ldots \\ X_{d-1} \end{bmatrix}_{d \times 1} = \begin{bmatrix} X_0 \\ X_1 \\ X_2 \\ \ldots \\ X_{d-1} \\ P_0 \\ P_1 \\ P_2 \\ P_3 \\ \vdots \\ P_{p-1} \end{bmatrix},$$

where:
- $I_{d \times d}$ is the identity matrix in which all the elements of the principal diagonal are 1 and all other elements are zero;
- d is the number of data blocks in the data array; and
- p is the number of parity blocks;

wherein the matrix multiplication operation performs:
an arithmetic multiplication to perform a shift operation on the data array to produce a shifted array comprising a plurality of rows, each row having the elements of a diagonal of the data array; and
an addition operation comprising performing a bitwise exclusive OR (XOR) operation on the elements in each row of the shifted array to produce a parity block, wherein the method further comprises:
storing the parity blocks across a plurality of the storage nodes, wherein decoding at least some of the parity blocks permits at least a portion of the data array to be recovered in the event that at least some of the data blocks of the plurality of data blocks are not accessible.

2. The method of claim 1, wherein the plurality of storage nodes comprise at least one storage node connected via a network.

3. The method of claim 1, wherein the method further comprises:
partitioning the data into an array having a greater number of data blocks of the plurality of data blocks than the number of storage nodes;
grouping the data blocks of the plurality of data blocks into a plurality of data block groups, wherein each data block group consists of a plurality of the data blocks; and
storing each data block group across a plurality of the storage nodes, such that the data blocks of each data block group are striped across a plurality of the storage nodes.

4. The method of claim 3, wherein the method further comprises:
encoding a parity block based on the data blocks in each data block group.

5. The method of claim 1, wherein encoding the plurality of parity blocks utilises only XOR operations.

6. The method of claim 1, wherein each data block and each parity block is represented by a polynomial with each element being a coefficient of the polynomial.

7. The method of claim 1, wherein the method further comprises:
encrypting at least one data block of the plurality of data blocks using an encryption key.

8. The method of claim 1, wherein the method further comprises:
compressing at least one data block of the plurality of data blocks.

9. The method of claim 1, wherein the method comprises performing the XOR operations simultaneously in parallel across a plurality of processing devices.

10. A data storage system comprising:
a processor; and
a memory, wherein the data storage system is configured to:
partition data into an array having a plurality of data blocks, wherein each data block of the plurality of data blocks is a column of elements of the data array;
store the plurality of data blocks across a plurality of storage nodes such that each storage node stores at least one of the data blocks of the plurality of data blocks;
encode a parity array (P) comprising a plurality of parity blocks based on the data array by:
performing a matrix multiplication operation in accordance with this equation:

$$\begin{bmatrix} & & & I_{d \times d} & & \\ 1 & 1 & 1 & \ldots & 1 \\ 2^{d-1} & 2^{d-2} & 2^{d-3} & \ldots & 1 \\ 1 & 2^1 & 2^2 & \ldots & 2^{d-1} \\ 2^{2 \times (d-1)} & 2^{2 \times (d-2)} & 2^{2 \times (d-3)} & \ldots & 1 \\ 1 & 2^2 & 2^4 & \ldots & 2^{2 \times (d-1)} \\ \vdots & \vdots & \vdots & \vdots & \vdots \end{bmatrix}_{(d+p) \times d} \times \begin{bmatrix} X_0 \\ X_1 \\ X_2 \\ \ldots \\ X_{d-1} \end{bmatrix}_{d \times 1} = \begin{bmatrix} X_0 \\ X_1 \\ X_2 \\ \ldots \\ X_{d-1} \\ P_0 \\ P_1 \\ P_2 \\ P_3 \\ \vdots \\ P_{p-1} \end{bmatrix}$$

where:
- $I_{d \times d}$ is the identity matrix in which all the elements of the principal diagonal are 1 and all other elements are zero;
- d is the number of data blocks in the data array; and
- p is the number of parity blocks;

wherein the matrix multiplication operation performs:
an arithmetic multiplication to perform a shift operation on the data array to produce a shifted array comprising a plurality of rows, each row having the elements of a diagonal of the data array; and
an addition operation comprising performing a bitwise exclusive OR (XOR) operation on the elements in each row of the shifted array to produce a parity block, wherein the data storage system is further configured to:
store the parity blocks across a plurality of the storage nodes, wherein decoding at least some of the parity blocks permits at least a portion of the data array to be recovered in the event that at least some of the data blocks of the plurality of data blocks are not accessible.

11. The data storage system of claim 10, wherein the data storage system further comprises:
a plurality of storage nodes, at least one of the storage nodes being connected via a network.

12. The data storage system of claim 10, wherein the data storage system further comprises:
   an XOR processing module which is coupled to the processor, the XOR processing module being configured to only execute XOR processing operations.

13. The data storage system of claim 10, wherein the data storage system further comprises:
   an encryption module which is configured to encrypt at least one of the data blocks of the plurality of data blocks using an encryption key.

* * * * *